April 2, 1935.  E. W. STACEY  1,996,127
MACHINE FOR OPERATING UPON SHEET MATERIAL
Filed Feb. 17, 1931
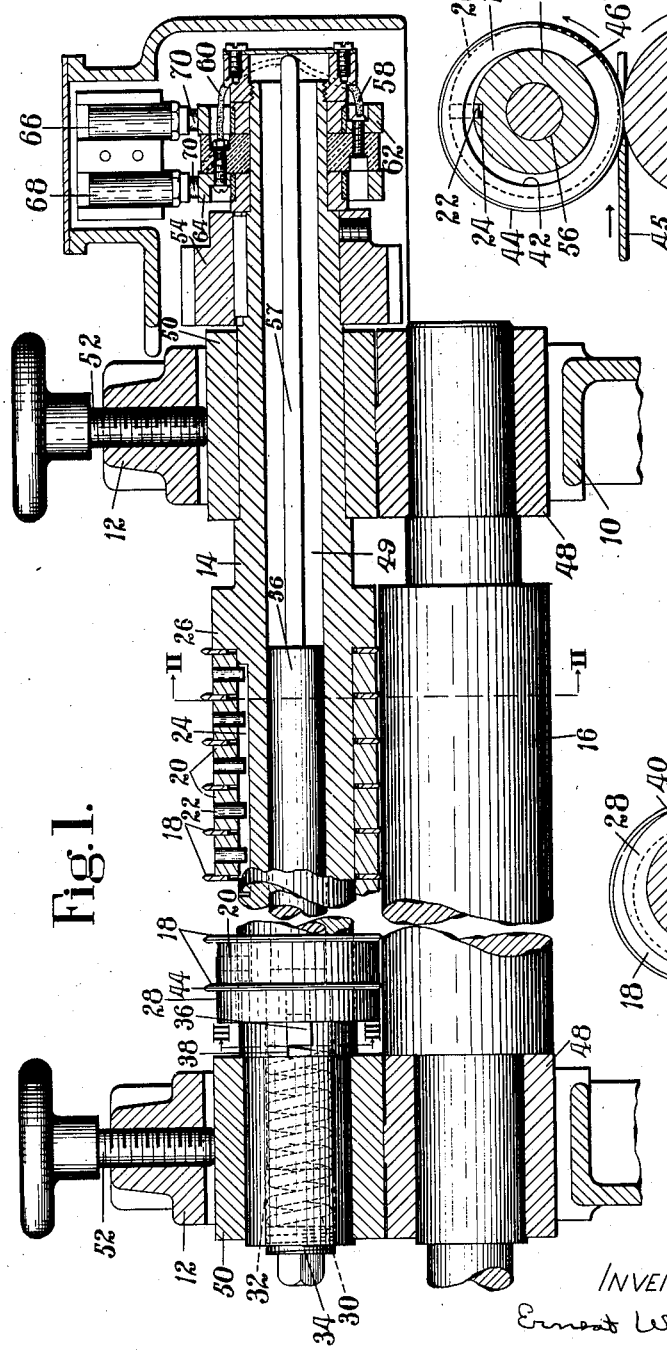

Patented Apr. 2, 1935

1,996,127

UNITED STATES PATENT OFFICE 1,996,127

MACHINE FOR OPERATING UPON SHEET MATERIAL

Ernest W. Stacey, Beverly, Mass., assignor to United Shoe Machinery Corporation, Paterson, N. J., a corporation of New Jersey Application February 17, 1931, Serial No. 516,386

19 Claims. (Cl. 164—70)

This invention relates to machines for operating upon sheet material and is herein illustrated as embodied in a machine for cutting sheet material, such as rubber, into strips, for example, of the type employed for foxing in canvas footwear.

In stripping machines of one type heretofore used, it has been customary to employ disk cutters located at spaced intervals along a rotatable shaft or arbor for cutting into strips sheet material advanced between the arbor and a work support commonly in the form of a roll. In cutting certain materials, such as rubber, it has been found in many instances that more satisfactory cutting is obtained by forcing the cutter through the material into engagement with the work support than by attempting to shear the material. However, considerable difficulty has attended the use in this manner of disk cutters mounted upon an arbor, by reason of the fact that all of the cutters must be accurately ground to the same diameter so that they will bear evenly upon the work support; otherwise, some of the cutters will not cut cleanly through the material. This difficulty is aggravated, in cases where the arbor is comparatively long, by the fact that, under the pressure required to produce cutting, unless the arbor is of massive construction it may be distorted to such extent that some of the cutters will not pass completely through the material at all times during their rotation, thus resulting in incomplete severing of strips or in the production of strips having ragged edge portions.

In view of the foregoing, it is an object of the present invention to provide an improved machine of the type referred to which, without sacrificing any of the advantages of such machines as heretofore constructed, will be light in its construction and accurate in its operation, and which will require little effort in the assembly and maintenance of the parts. Accordingly, in one aspect the invention consists in the provision of a backing member or work support and a rotatable arbor upon which is loosely carried an annular tool the inner radius of which is greater than that of the arbor and the outer radius of which is greater than the distance between the axis of the arbor and the work support, together with means for rotating the tool for operation upon sheet material advanced between the arbor and the work support.

Preferably, and as illustrated, the annular tool is in the form of a cutting disk, and a plurality of such disks is carried by the arbor, the disks being spaced longitudinally thereof by collars which are slidable along the arbor but are keyed to it for rotation therewith. Resilient means, illustrated as a spring carried by the arbor, is operable to exert pressure axially of the arbor upon the collars and disks, causing frictional engagement between them sufficient upon rotation of the arbor to rotate the disks and to force the disks against the backing member or work support. Preferably, means is provided for adjusting the spring pressure so that the pressure of the cutters upon the work support can be regulated.

This construction is particularly advantageous in that, during rotation of the arbor, the cutting disks are continually forced against the backing member, thus insuring accurate cutting of material advanced past the disks. Cutting disks having comparatively blunt edges can be used to advantage thus to prolong the life of the backing member. Furthermore, it is not necessary that the disks be of the same diameter, thus obviating any necessity for accurate grinding. In view of the fact that the inner radii of the disks are greater than the radius of the arbor, distortion of the latter will not affect the cutting and, consequently, the arbor may be light in construction. This construction also facilitates assembly of disks upon the arbor for the cutting of strips of various widths at the same time, it being possible to space the disks along the arbor as required by making use of collars of the proper length.

Other objects and features of the invention will be apparent from the following detailed description when taken in connection with the accompanying drawing and will be pointed out in the claims.

In the drawing,

Fig. 1 is a cross-sectional view taken transversely through a machine embodying the invention;

Fig. 2 is a cross-section taken along line II—II of Fig. 1; and

Fig. 3 is a cross-section taken along lines III—III of Fig. 1.

The machine illustrated in the drawing is designed particularly for forming foxing strips from unvulcanized sheet rubber. This machine comprises a frame 10 having two standards 12 within which are rotatably mounted an arbor 14 and a work support or backing roll 16 arranged with their axes parallel. The arbor 14 carries a plurality of cutters or slitters in the form of disks 18 which, upon rotation of the arbor and backing roll, cooperate with the latter to sever into strips sheet material advanced past the cutting disks. The cutting disks are spaced along the arbor by collars 20 corresponding in length to the width of the strips to be cut. Each of the collars is provided with a pin 22 which extends into a longitudinal slot 24 in the arbor, thus keying the collars to the arbor for rotation therewith while at the same time permitting sliding of the collars longitudinally of the arbor. The position of the assembly of cutting disks and collars along the arbor 14 is determined by a stop in the form of a flange 26 upon the arbor and against which the cutter at one end of the assembly bears. The cutter at the other end of the assembly is engaged by a bushing 28 slidable upon the arbor, and to which pressure is applied to clamp the assembly upon the arbor between the flange 26 and the bushing 28.

Rotation of the cutters 18 upon rotation of the arbor 14 is accomplished by frictional engagement of the collars 20 with the cutters caused by the clamping pressure exerted axially of the arbor upon the assembly by the flange 26 and the bushing 28. This pressure is effected by a spring 30 mounted in a bore 32 in one end of the arbor. One end of the spring 30 bears against a set screw 34 in the bore 32 and the other end of the spring engages a key 36 positioned in a radial slot 38 in the arbor 14 and received in a recess 40 in the bushing 28. The slot 38 extends axially of the arbor a sufficient distance to permit considerable movement of the key 36 toward and away from the flange 26 in taking up the slack between the collars 20 and cutters 18. The key 36 functions to secure the bushing 28 to the arbor 14 for rotation therewith while permitting movement of the bushing longitudinally of the arbor, and also to transmit pressure of the spring 30 to the assembly. The spring pressure is adjusted by means of the set screw 34, and thus the friction between the collars 20 and cutters 18 and consequently the force tending to rotate the cutters with the arbor can be regulated.

Each of the cutting disks or slitters 18 is annular in shape, the inner radius of the disk or the radius of its inner wall 42 being substantially greater than the radius of the arbor 14 upon which the disk is loosely carried so that any point in the circumference of the disk can be moved radially of the arbor with the result that the disk is capable of movement into various positions with its axis eccentric to that of the arbor. The outer radius of the disk or the radius of its curved cutting edge 44 is greater than the distance between the axis of the arbor 14 and the periphery of the roll 16. Consequently, when the arbor 14 is rotated in a contra-clockwise direction (Fig. 2), each disk 18 will be unable to pass freely by the roll 16 but will be forced against it and will be retarded by it with the result that the disk will be thrown into position with its axis eccentric to that of the arbor at a point above and to the left of the axis of the arbor, movement to the left being limited by contact of the inner wall 42 of the disk with the periphery of the arbor, as indicated by reference character 46. This eccentric position will be maintained upon further rotation of the arbor, there being a slipping between the side walls of the disk and the collars adjacent to it and between the inner wall 42 and the periphery of the arbor. However, the spring pressure will tend to rotate the disk about its new axis. Thus it will be seen that by the construction just described, the cutting disks 18 are forced against the backing roll 16 under a yielding pressure to maintain the cutting edges of the disks continually in engagement with the backing roll. As above indicated, the pressure can be regulated as desired by adjustment of the screw 34. Since the pressure tending to rotate the disks is the same throughout the collar-and-disk assembly, the disks will be forced with substantially equal pressures against the backing roll. It is to be noted that, since the disks are rotated by collars 20 about axes eccentric to that of the arbor 14 until the disks engage the backing roll 16, the disks need not be of the same size, and it is unnecessary to grind them accurately to a given diameter.

As shown, the cutting edges 44 of the disks are V-shaped in cross-section and preferably are not very sharp. The cutting with such edges is more of a squeezing than a shearing action, and has been found to be particularly effective in operating upon rubber. Sheet material, such as sheet rubber indicated by reference character 45 (Fig. 2), is advanced toward the cutters by any convenient means, such as a belt conveyor (not shown), and the backing roll 16, which is driven in the opposite direction to that of the arbor 14, assists in advancing the material to be operated upon past the cutters.

The roll 16 is supported by bearings 48 located in guideways in the standards 12, and the arbor 14 is similarly supported by bearings 50 which rest upon the bearings 48, the roll and arbor being secured in assembled relation by set screws 52 carried by the standards. The arbor is driven by a gear 54 rotated by suitable means, and the roll 16 is driven by similar means (not shown). This construction facilitates the removal of the arbor and the substitution of another arbor having cutting disks differently spaced for cutting strips of different widths.

It has been found that the cutting of rubber sheet material is facilitated by heating the cutters operating upon the material. Accordingly, the arbor 14 is provided with a bore 49 within which is located an electrical heating unit 56. Current is conveyed to the unit through a conduit 57 by leads 58 and 60 which extend respectively to insulated collars 62 and 64 which, in turn, make contact with supply lines 66 and 68 through brushes 70. The heating unit 56 heats the arbor which conducts heat to the collars 20 and disks 18 and, in turn, to the material passing between the collars and the backing roll 16, raising the temperature of the material sufficiently to render it more susceptible to the action of the disks 18 in severing it.

In operating the machine, sheet material, such as unvulcanized sheet rubber 45, is fed between the backing roll 16 and the arbor 14, which rotate in directions to advance the material past the cutting disks 18, which by frictional engagement with the collars 20 under pressure of spring 30 are forced through the material and continuously against the backing roll to sever the material into strips.

Having described my invention, what I claim as new and desire to secure by Letters Patent of the United States is:—

1. A machine for operating upon sheet material, comprising a backing member, a rotatable arbor, an annular tool loosely carried by the arbor, the inner radius of said tool being greater than the radius of the arbor and the outer radius of the tool being greater than the distance between the axis of the arbor and the backing member, means for rotating the arbor, and yieldable means for securing the tool to the arbor operable upon rotation of the arbor to force the tool toward the backing member.

2. A machine for operating upon sheet material, comprising a backing member, a rotatable arbor spaced from the backing member, annular cutting tools loosely carried by the arbor, the inner radii of said tools being greater than the radius of the arbor and the outer radii of said tools being greater than the distance between the axis of the arbor and the backing member, and yieldable means for securing the tools to the arbor for rotation therewith.

3. A machine for operating upon sheet material, comprising an arbor and a backing member, an annular tool loosely carried by the arbor, the inner radius of said tool being greater than the radius of the arbor and the outer radius of the tool being greater than the distance between the axis of the arbor and the backing member, and means for effecting rotation of the tool and arbor to cause engagement of the tool with sheet material advanced between the arbor and the backing member.

4. A machine for operating upon sheet material, comprising a work support, a rotatable arbor, a plurality of annular tools loosely carried by the arbor, the inner radius of each of the tools being greater than the radius of the arbor and the outer radius of each of the tools being greater than the distance between the axis of the arbor and the work support, and means carried by the arbor for frictionally engaging the tools to cause them to rotate with the arbor for forcing the tools toward the work support in effecting an operation of the tools upon sheet material advanced between the arbor and the work support.

5. A machine for operating upon sheet material, comprising an arbor, a plurality of cutting tools loosely carried by the arbor, collars secured to the arbor for rotation therewith and arranged frictionally to engage the tools, means for rotating the arbor and yielding means for exerting pressure upon the collars to effect rotation of the tools upon rotation of the arbor.

6. A machine for operating upon sheet material, comprising an arbor, a plurality of cutting tools loosely carried by the arbor, collars secured to the arbor for rotation therewith and arranged to engage the tools, yielding means operable upon rotation of the arbor for causing frictional engagement between the collars and the tools to rotate the latter, and means for regulating the pressure exerted by the yielding means.

7. A machine for operating upon sheet material, comprising a work support, a rotatable arbor, a plurality of annular cutting tools loosely carried by the arbor, the inner radius of each of which is greater than the radius of the arbor and the outer radius of each of which is greater than the distance between the work support and the arbor, whereby upon rotation of the arbor the tools are rotated about axes eccentric to that of the arbor.

8. A machine for operating upon sheet material, comprising a rotatable arbor, annular cutting tools floatingly carried by the arbor, means for spacing the tools along the arbor, and yielding means for exerting pressure longitudinally of the arbor to cause the tools to rotate therewith.

9. A machine for operating upon sheet material, comprising a rotatable arbor, a plurality of annular cutting tools carried by the arbor, collars carried by the arbor and keyed to it for rotation therewith, said collars being located between successive tools to space the latter along the arbor, a stop on the arbor, and resilient means for forcing the collars and tools toward the stop to clamp them together for effecting rotation of the tools upon rotation of the arbor.

10. A cutting machine comprising an arbor and a work support, an annular cutting disk loosely carried by the arbor, the inner radius of said cutting disk being greater than the radius of the arbor and the outer radius of the disk being greater than the distance between the axis of the arbor and the work support, and means for effecting rotation of the disk for cutting sheet material advanced between the arbor and the work support.

11. A cutting machine comprising a rotatable backing roll, a rotatable arbor positioned with its axis parallel to that of the backing roll, a plurality of cutting disks loosely carried by the arbor, collars mounted upon the arbor for spacing the disks longitudinally of the arbor, and resilient means for exerting pressure upon the collars and disks longitudinally of the arbor.

12. A cutting machine comprising a rotatable arbor, a rotatable backing roll spaced from the arbor, a plurality of annular cutting disks surrounding the arbor, the inner radius of each disk being greater than the radius of the arbor and the outer radius of each disk being greater than the distance between the axis of the arbor and the periphery of the backing roll, collars secured to the arbor to rotate therewith and positioned between successive disks to space the disks longitudinally of the arbor, and means for exerting pressure upon the disks and collars to rotate the disks.

13. A machine for operating upon sheet material, comprising a rotatable arbor, a plurality of annular cutting disks loosely carried by the arbor, a plurality of collars for spacing the disks longitudinally of the arbor, means for securing the collars to the arbor for rotation therewith, and resilient means for causing frictional engagement of the collars with the disks to effect rotation of the disks upon rotation of the arbor.

14. A machine for operating upon sheet material, comprising a rotatable arbor, a plurality of annular cutting disks loosely carried by the arbor, a plurality of collars slidably mounted upon the arbor for spacing the disks along the arbor and having each a pin, a longitudinally extending keyway in the arbor within which each of the pins is positioned so that the collars are slidable along the arbor but are rotatable therewith, a stop on the arbor for limiting movement of the disks and collars longitudinally thereof, and a spring for forcing the disks and collars toward the stop.

15. A machine for operating upon sheet material, comprising a backing roll and a rotatable arbor having their axes parallel, a plurality of annular cutting disks loosely carried by the arbor, the inner radius of each of the disks being greater than the radius of the arbor and the outer radius of each of the disks being greater than the distance between the axis of the arbor and the periphery of the backing roll, a plurality of collars keyed to the arbor and slidable longitudinally thereof for spacing the disks along the arbor, a flange on the arbor, and a spring carried by the arbor for forcing the disks and collars toward the flange with sufficient pressure to cause rotation of the disks toward the backing roll upon rotation of the arbor.

16. A machine for operating upon sheet material comprising an arbor, an annular cutting disk mounted for rotation upon the arbor and having an inner radius substantially greater than the radius of the arbor to provide for yielding of the disk radially of the arbor, collars slidably secured to the arbor, and means for exerting pressure upon the collars longitudinally of the arbor to cause the collars frictionally to engage the disk.

17. Slitting means including: a backing roll, an annular supporting member, a plurality of score-cut slitters, to engage the backing roll, mounted on the annular supporting member; and means to admit of individual yielding movement of said slitters one independently of another in a direction radial with respect to said supporting member and at any point circumferentially thereof when said slitters are pressed against the backing roll.

18. Slitting means including: a backing roll, an annular supporting member, a plurality of score-cut slitters, to engage the backing roll, rotatably mounted on the annular supporting member, and means to admit of individual yielding movement of said slitters one independently of another in a direction radial with respect to said supporting member and at any point circumferentially thereof when said slitters are pressed against the backing roll.

19. Slitting means including: a backing roll, an annular supporting member, a plurality of score-cut slitters, to engage the backing roll, mounted on the annular supporting member, spacing members mounted on the annular supporting member between the slitters, and means to admit of individual yielding movement of said slitters one independently of another in a direction radial with respect to said supporting member and at any point circumferentially thereof when said slitters are pressed against the backing roll.

ERNEST W. STACEY.

CERTIFICATE OF CORRECTION.

Patent No. 1,996,127.  April 2, 1935.

ERNEST W. STACEY.

It is hereby certified that error appears in the printed specification of the above numbered patent requiring correction as follows: Page 4, first column, line 8, claim 16, after "yielding" insert the word movement; and that the said Letters Patent should be read with this correction therein that the same may conform to the record of the case in the Patent Office.

Signed and sealed this 27th day of August, A. D. 1935.

(Seal)

Leslie Frazer
Acting Commissioner of Patents.